F. A. ODDIE.
GEAR CHANGING MECHANISM.
APPLICATION FILED JUNE 15, 1915.
1,185,528.
Patented May 30, 1916.
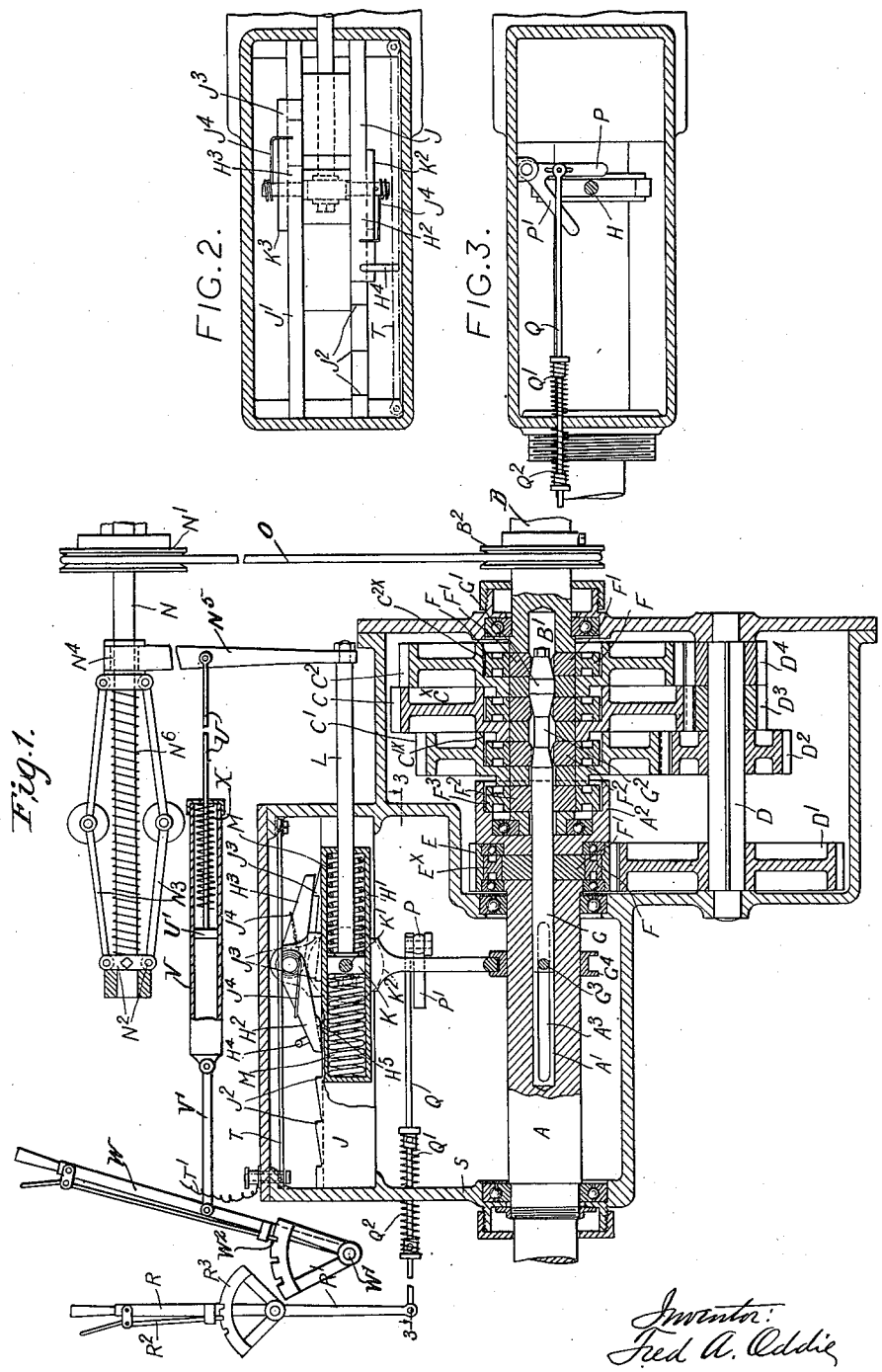

UNITED STATES PATENT OFFICE.

FRED ALBERT ODDIE, OF LONDON, ENGLAND.

GEAR-CHANGING MECHANISM.

1,185,528.      Specification of Letters Patent.     Patented May 30, 1916.

Application filed June 15, 1915. Serial No. 34,230.

*To all whom it may concern:*

Be it known that I, FRED ALBERT ODDIE, subject of the King of England, residing at Maida Vale, London, in England, have invented certain new and useful Improvements in Gear-Changing Mechanism, of which the following is a specification.

This invention relates to variable speed gears more especially for self-propelled vehicles and has for its object to provide a gear which is automatically changed in accordance with the speed of the vehicle and the load on the engine.

It has previously been proposed to provide variable speed gears which are semi-automatic in operation, the moment at which the change is to be effected being determined by the driver who has to operate some member which effects the change of gear or brings the change mechanism into operation. In such gears however want of judgment on the driver's part results in the gear being changed too soon or too late. In other cases the change has been effected automatically by the action of a governor directly actuated by the engine or driving shaft but in these constructions the change in the gear has resulted from variations in the speed of rotation of the engine. This is unsatisfactory since to obtain proper efficiency the rotational speed of the motor should be maintained as far as possible constant or within certain limits.

According to this invention a centrifugal governor to which rotation is imparted by the shaft driven through the gear is directly connected to the gear changing mechanism so that the gear is changed in accordance with and as a result of variations in the rotational speed of the driven shaft. The connection between the governor and the gear change mechanism comprises a sliding member which is coupled to the gear change rod and carries pawls adapted to engage a fixed toothed rack, and a member coupled to the governor which is yieldingly connected to the sliding member so as to operate the latter after releasing a pawl from engagement with the rack. The arrangement is such that whereas the change speed gear is automatically actuated at certain predetermined speeds of the driven shaft when the pawl and rack mechanism causes the operation of the change gear in certain predetermined steps or stages, no change takes place between these speeds.

The actual variable speed mechanism may be of any suitable type but it is preferred to adopt a speed gear of the known kind in which the various gear wheels are constantly in mesh, those corresponding to the required speed being connected by clutches or the like to their shaft at the required moment. Preferably a tapered plunger moving longitudinally within a hollow shaft is employed to actuate radially movable friction members which lock the selected gear wheel to its shaft, the plunger being moved within the hollow shaft under the action of the centrifugal governor at certain predetermined intervals, and occupying a neutral or inoperative position when the vehicle is at rest.

In operation the plunger may be moved by some pedal or actuating lever into its initial operative position, which may for instance lock the lowest gear wheel to the driven shaft. As the speed of the shaft increases the centrifugal governor will automatically and at a predetermined speed actuate the pawl and rack mechanism to shift the gear-operating plunger so as to bring into play the successive pair of gear wheels, the operation being repeated at predetermined intervals until the shaft is running at its highest speed. When the speed of the shaft falls, for instance in the case of a vehicle, owing to a hill being encountered or the load on the vehicle increasing for some other reason, the centrifugal governor moves the gear-actuating plunger in the reverse direction so as to bring into engagement gear wheels suitable for a lower speed. In traffic or where it is necessary to reduce the speed of the car intentionally, the engine may be throttled down which results in the driven shaft rotating more slowly whereupon the gear is automatically changed down, the reverse operation taking place when the engine is accelerated or the throttle opened. To effect reverse drive, the gear-operating plunger can have an additional longitudinal movement imparted to it through a suitable pedal or lever and if desired a socket to receive a hand lever or the like may be provided at some suitable point in the length of the actuating plunger or some connection may be provided so as to enable the latter to be manually operated should occasion arise.

The accompanying drawings illustrate the invention as applied by way of example to a variable speed gear intended for use in a motor road vehicle.

Figure 1 is a sectional elevation through a gear box showing the principal features of the change speed mechanism. Fig. 2 is a plan of a part of the mechanism. Fig. 3 is a sectional plan on the line 3—3 of Fig. 1.

Like letters indicate like parts throughout the drawings.

The variable speed gear which in conjunction with the present invention is more particularly described, comprises a driving shaft A and a driven shaft B disposed in alinement therewith. The driven shaft B carries loose on it gear wheels C, for first speed, C' for second speed and $C^2$ for reverse which are engaged by and driven through pinions on a lay or countershaft D from a pinion E on the driving shaft A. The pinion E gears with a toothed wheel D' on the lay shaft which also carries a pinion $D^2$ in mesh with the toothed wheel C', a pinion $D^3$ in mesh with the pinion C and a pinion $D^4$ which gears with the pinion $C^2$ through an intermediate pinion not shown in the drawings. Each of the toothed wheels C, C' and $C^2$ together with the pinion E is formed with an internal friction clutch surface $C^x$, $C'^x$, $C^{2x}$ and $E^x$ adapted to be engaged in each case by similar pairs of clutch members F which can be moved radially to effect engagement by means of the radial plungers F'. This radial movement is brought about by means of a rod G which can be moved axially in corresponding holes A' and B' formed in the abutting ends of the driving shaft A and the driven shaft B. The rod G carries at its end an enlargement G' of such dimensions that when the rod is moved into the necessary position it will force the radial plungers F' outward and cause the clutch members F to lock one or other of the toothed wheels C, C' or $C^2$ to the driven shaft B. Between the radial plungers $F^2$ along the driven shaft B are spaces in which when the enlargement G' lies in any one of them the gear is in "neutral", that is to say, the driving shaft A is free to revolve without imparting motion to the driven shaft B. The plungers F' which operate the clutch members F by means of which the pinion E is locked to the driving shaft A are normally maintained in their outward operative positions owing to the diameter of the rod G being such as to effect this. When, however, the rod G has been moved successively to bring into operation the first gear wheel C and the second gear wheel C', further movement of the rod G toward the left as shown in Fig. 1, will result in throwing in the top gear which comprises a direct connection between the driving shaft A and the driven shaft B. It is necessary then to throw out of gear or release the pinion E and this is effected by means of a reduced part $G^2$ formed on the rod G. This reduced part $G^2$ comes into place so as to release the clutch controlling the pinion E when the enlargement G' is in the position to engage and move outwardly the plungers $F^2$ which operate the clutch members $F^3$ by means of which the driven shaft B is locked to a clutch drum $A^2$ formed on the end of the driving shaft A. Thus by merely moving the shaft G axially within the ends of the shafts A and B these two shafts can be geared together in various ratios or directly coupled, or connected so as to effect reverse driving of the shaft B. The axial movement of the rod G is effected by means of a pin $G^3$ which passes through the end of this rod and through a slot $A^3$ formed in the driving shaft A the pin $G^3$ being connected to a collar $G^4$ loosely mounted on the exterior of the shaft A in such a manner that this collar can move freely along the shaft carrying with it the rod G.

The collar $G^4$ is engaged by an arm H which projects laterally from a member H' which is formed as a cylindrical casing carried in guides J J' in which it can slide parallel to the shaft A. Within the member H' is a piston K on the end of a piston rod L which projects through one end of the sliding casing H'. On each side of the piston K and between the face of that piston and the end of the casing H' is disposed a coiled spring M. These springs M are of such strength that they will tend to constantly maintain the piston K in a central position in the length of the member H' and permits sliding motion to be imparted to this member through the piston rod L, this sliding motion effecting the axial movement of the rod G and resulting in a change of gear.

On the upper side of the member H' are pivotally mounted two pawls $H^2$ $H^3$ which face in opposite directions and rest respectively on the guides J J' and engage teeth formed on these guides. The teeth $J^2$ carried by the guide J with which the pawl $H^2$ engages are three in number corresponding to the first and second gears and the direct drive. The teeth $J^3$ formed on the guide J' are also three in number but oppositely disposed with relation to the teeth $J^2$ and adapted to be engaged by the pawl $H^3$. The teeth $J^2$ and the teeth $J^3$ are so relatively disposed that when the pawl $H^2$ is in engagement with a tooth $J^2$ the pawl $H^3$ is simultaneously in engagement with a tooth $J^3$ and thus the member H' and hence the rod G, are both locked in any position into which they have been moved, that is to say, when any particular gear is engaged. The piston K is provided with a transverse pin K' which passes laterally through longitudinal slots in the wall of the member H' and carries on its ends rollers $K^2$ $K^3$. These rollers lie at the sides of the guides J J' and are of such diameter as will enable them to come in contact with and lift the pawls H² H³ clear of the teeth J² J³ with which they may be in engagement. To effect this each of the pawls H² H³ is formed of greater width, as indicated in Fig. 2, than the guide J or J' and teeth J² J³. Thus the roller K² can come into contact with the overhanging part of the pawl H² and lift it clear of any one of the teeth J². The formation of the underside of each pawl H² H³ is such with relation to the diameter of the rollers K² K³ that the latter can move with the piston K within certain limits on either side of the midpoint of the member H' without either of the rollers K² K³ operating to trip either of the pawls H² H³ out of engagement with the teeth J² J³. If, however, the movement of the piston K within the member H' exceeds these predetermined limits a pawl will be lifted and then owing to the action of the springs M the member H', together with the arm H, will be moved and cause axial movement of the rod G and a change of gear. It will be noted that this change of gear may thus take place in either direction either from first to second speed and thence to the direct drive or downward from the direct drive to the first speed. When the driven shaft B is at rest the member H' will automatically assume a position such that the gear is in neutral and the change from this position to first speed or into reverse is not effected automatically but by direct operation of the rod G by hand or otherwise in a manner which will be hereinafter described.

The movement of the controlling rod L and piston K and hence the movement of the sliding member H H' and the change of gear is brought about by the action of a governor of suitable type such as the centrifugal governor illustrated in Fig. 1. This governor comprises a spindle N carried in suitable bearings and provided with a pulley wheel N' driven by a belt O from a pulley wheel B² on the driven shaft B. The spindle N carries fixed to it at N² pivoted weighted links N³ connected to a sliding sleeve N⁴ which has mounted thereon, so that it cannot turn with the sleeve, an arm N⁵ in turn connected to the piston rod L. A coiled spring N⁶ disposed around the spindle N tends to move the sleeve N⁴ along the spindle and against the centrifugal force which, operating on the weighted links N³, tends to move the sleeve N⁴ in the opposite direction. It will be seen that the rotational speed of the governor is proportional to or determined by that of the driven shaft B and by suitable adjustment of the governor the movement of the piston K will be determined in accordance with this speed.

To prevent straining the mechanism it is desirable to provide either the pulley N' or the pulley B² with some free-wheel device of known type so that the driven shaft be can on occasion overrun the governor spindle N or will be inoperative to rotate this spindle if the gear is in neutral or when reverse driving of the shaft B is taking place.

The initial movement of the gear from neutral into first speed or into reverse may be effected by the following device illustrated in Fig. 1 and also in Fig. 3: Adjacent to the arm H there is pivotally mounted on a suitable bracket a forked lever P P' which can be moved about its pivot by means of a rod Q connected to a pivoted hand lever R R' provided with a finger catch R² which will engage the teeth of a fixed quadrant R³. Where the rod Q passes through the wall of the casing S it is provided with coiled springs Q' Q² which bear against the wall S and against collars mounted on the rod Q. The forked lever P P' normally lies in the position shown in Fig. 3 to which it will be returned by the action of the springs Q Q' when the catch R² of the hand lever R is released. The arm H then occupies a position such that the gear is in neutral. If now the hand lever R is moved so as to bring the arm P of the forked lever against the arm H the latter will be moved so as to bring the rod G into a position when by means of the enlargement G', the first speed is thrown in. The gear is now in condition to be automatically operated when power is applied to the driving shaft A as the driven shaft B will then be rotated through the first speed. The position in which the forked lever P P' remains is such as shown in Fig. 3 when the arm P' is clear of the arm H leaving this free to be moved to the left as shown in Fig. 3 when further changes of gear up to the direct drive are effected. If now it is desired to reverse the drive of the shaft B the hand lever R is moved in the opposite direction so as to bring the arm P' against the arm H and force the rod G into the position necessary to operate the clutch which locks the reverse gear wheel C² to the driven shaft B. The hand lever R must be locked by the catch R² in this position or held there so long as the reverse gear is required, otherwise when the lever R is released the spring Q² will restore the forked lever P P' to its normal position and in so doing move the arm H and bring the rod C into the neutral position.

The mechanism for engaging the first gear or the reverse may be operated in other ways than that more particularly described above and illustrated in the drawings.

When applying the invention to a motor road vehicle it is convenient to provide means whereby when the vehicle is running slowly, that is to say when the rotational speed of the driven shaft B is low, the drive shall not be through a low gear but through a higher gear or direct. This end can be achieved with the present invention for example by providing some device whereby the action of the governor spring $N^6$ is prevented or decreased. The device illustrated in the drawings as one instance of how this control of the governor may be put into practice will now be described.

Pivotally connected to the gear operating arm $N^5$ is a rod U on the end of which is disposed a piston U'. The latter can slide freely in a cylinder V through one end of which passes the piston rod U while the other end of the cylinder is connected by a rod V' to a hand lever W. The latter is pivoted at W' and moves over a fixed notched quadrant $W^2$. A spring controlled catch enables the lever W to be locked in various positions. Within the cylinder V and between the piston U' and the free end of the cylinder through which the piston rod passes is disposed a coiled spring X.

The device operates as follows: When the parts are in the positions indicated the governor is free to act on the change gear mechanism in accordance with the speed of the driven shaft. If it is desired to modify the governor action the lever W is moved and locked and by this action the spring X is compressed in the cylinder V against the piston U' thus exerting through the rod W a pull on the gear-operating arm $N^5$ and tending to counteract the force exerted by the spring $N^6$ on the sliding sleeve $N^4$. Thus in effect the action of the governor spring $N^6$ is modified to an extent which is determined by the amount of tension applied through the controlling lever W in consequence of the compression of the spring X. This device may be arranged in various ways as found convenient.

The controlling lever, through which is brought into operation the spring which causes variation of the sensitiveness of the governor, may be disposed and operated in various ways.

It is desirable, particularly in the case of a motor road vehicle driven by an internal combustion engine, to provide some device which will prevent straining the change speed gear if from any cause the change from one gear to another should be delayed beyond the limit of speed determined for this change. Thus for example, it is conceivable that, owing to excessive torque or other cause the clutch device by which any gear is brought into operation, may cause the enlargement G' to jam temporarily and thus prevent the rod G from being moved as readily as would normally be the case. Under such circumstances if the rotational speed of the parts is increasing the governor will tend to move the piston K within the member H' beyond the proper limit. To provide for such a contingency the following device may be employed: On the pawl $H^2$ is mounted a contact stud $H^4$ or the like, and on its underside the pawl $H^2$ is shaped or provided with a projection $H^5$ of such dimensions that if, owing to jamming of the rod G and consequently the member H', the piston K is moved by the action of the governor beyond the point at which it would normally trip the pawl $H^2$ clear of the tooth $J^2$ with which it is engaged and effect the change of gear, continued movement of the piston K will, through the roller $K^2$ coming into contact with the projection $H^5$, cause the pawl $H^2$ to be raised still farther until the stud $H^4$ makes contact with a bar or rod T. This rod T is disposed parallel to the guide J being carried by the casing S but in such a manner as to be insulated therefrom and is connected by a suitable wire T' to the ignition circuit of the engine. Hence when under the conditions indicated, the stud $H^4$ is brought into contact with the bar T the engine will be short-circuited. By thus temporarily cutting out the engine the torque transmitted through the gear will temporarily decrease with the result that there will be a tendency for the driven shaft B to overrun the driving shaft, the effect of which will be to release the clutch of the gear which is in engagement and free the rod G. This rod G will then be immediately moved into the next gear with the result that the pawl $H^2$ will drop into engagement with the corresponding tooth $J^2$ and the interruption in the ignition circuit of the engine will cease. The engine will at once recommence firing and continue to run. By this means the mechanism will automatically cause such a check in the power transmitted to the driven shaft that any jamming of the mechanism will be counteracted and a change of gear will be effected in the desired manner.

It will be understood that the details of the construction above described and illustrated in the drawings may be modified to suit requirements and the particular purpose to which the device is applied. It is to be noted that the various parts of the mechanism are in many respects arranged as shown in the drawings for convenience of illustration and other dispositions may equally well be effected in practical use. Thus for example the governor and its spindle is shown as being disposed above the change speed gear whereas when applied to a motor road vehicle it would be more convenient to dispose the governor at one side. Similarly the member H', the guides J and J' and the other parts connected thereto in place of being arranged above the gear box may be disposed to one side thereof, the pawls naturally being on the upper side of the member H'. The weight of the pawls H² H³ may be relied on to insure their falling into engagement with the teeth J² J³ but conveniently each pawl is pressed downward by a coiled spring J⁴ carried on the stud on which the pawl is pivoted or otherwise disposed as found convenient. A contact stud such as H⁴ and contact bar T may if desired be provided for the pawl H³ and not only for the pawl H² as shown in the drawings. By a suitable lateral disposition of the contact studs on the pawls it may be possible to employ a single contact bar T disposed between the guides J J' so that this single bar will serve for both pawls to short-circuit the engine when occasion requires.

Though more especially intended for use with a motor road vehicle it is obvious that the present invention may equally well be employed in other cases where a variable speed gear of this type is used.

What I claim as my invention and desire to secure by Letters Patent is:—

1. In a gear changing mechanism the combination of a driving shaft, a driven shaft, means comprising gear wheels constantly in mesh for transmitting power in variable ratio from the driving to the driven shaft, means for coupling the gear wheels to their respective shafts and the shafts to each other in accordance with the desired power ratio, a sliding member connected to the coupling means, means for locking the sliding member in positions corresponding to the several gear ratios, a governor, means for imparting rotation thereto from the driven shaft, a yielding connection between the governor and the sliding member through which the governor can move the sliding member, and means carried by this connection for actuating the sliding member locking means as set forth.

2. In a gear changing mechanism the combination of a driving shaft, a driven shaft, means comprising gear wheels constantly in mesh for transmitting power in variable ratio from the driving to the driven shaft, means for coupling the gear wheels to their respective shafts and the shafts to each other in accordance with the desired power ratio, a sliding member connected to the coupling means, pawls carried by the sliding member, fixed racks adapted to be engaged by these pawls, a governor, means for imparting rotation thereto from the driven shaft, a yielding connection between the governor and the sliding member through which the governor can move the sliding member, and means carried by this connection for disengaging the pawls from the racks as set forth.

3. In a gear changing mechanism the combination of a driving shaft, a driven shaft, means comprising gear wheels constantly in mesh for transmitting power in variable ratio from the driving to the driven shaft, means for coupling the gear wheels to their respective shafts and the shafts to each other in accordance with the desired power ratio, a sliding member connected to the coupling means, pawls carried by the sliding member, fixed racks adapted to be engaged by these pawls, a governor, means for imparting rotation thereto from the driven shaft, a member connected to the governor and adjacent to the sliding member, springs forming operative connections between the governor member and the sliding member, and means carried by the governor member for disengaging the pawls from the racks as set forth.

4. In a gear changing mechanism the combination of a driving shaft, a driven shaft, means comprising gear wheels constantly in mesh for transmitting power in variable ratio from the driving to the driven shaft, means for coupling the gear wheels to their respective shafts and the shafts to each other in accordance with the desired power ratio, a sliding member connected to the coupling means, pawls carried by the sliding member, fixed racks adapted to be engaged by these pawls, a governor, means for imparting rotation thereto from the driven shaft, a member mounted so as to reciprocate in the sliding member a spring between the sliding member and each face of the reciprocating member the springs forming operative connections between these members, a connection between the reciprocating member and the governor, and means carried by the governor member for disengaging the pawls from the racks as set forth.

5. In a gear changing mechanism the combination of a driving shaft, a driven shaft, means comprising gear wheels constantly in mesh for transmitting power in variable ratio from the driving to the driven shaft, means for coupling the gear wheels to their respective shafts and the shafts to each other in accordance with the desired power ratio, a sliding member connected to the coupling means, fixed racks with opposed teeth disposed adjacent to the sliding member, pawls carried by the sliding member and adapted to lock this member in various positions by engagement with the racks, a governor, means for imparting rotation thereto from the driven shaft, a member connected to the governor and adjacent to the sliding member, springs forming operative connections between the governor member and the sliding member, and rollers so mounted on the governor member that movement of this member relative to the sliding member within limits determined by the springs connecting them will cause disengagement of the pawls from the racks by the rollers as set forth.

6. In a gear changing mechanism the combination of a driving shaft, a driven shaft, means comprising gear wheels constantly in mesh for transmitting power in variable ratio from the driving to the driven shaft, means for coupling the gear wheels to their respective shafts and the shafts to each other in accordance with the desired power ratio, a sliding member connected to the coupling means, means for locking the sliding member in positions corresponding to the several gear ratios, a governor, means for imparting rotation thereto from the driven shaft, a yielding connection between the governor and the sliding member through which the governor can move the sliding member, means carried by this connection for actuating the sliding member locking means and means for moving the sliding member and the gear coupling means by hand when the gear is in a neutral position as set forth.

7. In a gear changing mechanism the combination with a driving shaft, a driven shaft, a series of gear wheels loosely mounted on the driven shaft, a gear wheel loosely mounted on the driving shaft, a series of gear wheels meshing with the gear wheels on the driving and driven shafts for transmitting power from the driving to the driven shafts, means for coupling respectively to the driven and driving shafts the gear wheels mounted thereon, means for directly coupling the shafts together, a sliding member connected to all these coupling means, means for locking the sliding member in positions corresponding to the several gear ratios, a governor, means for imparting rotation thereto from the driven shaft, a yielding connection between the governor and the sliding member through which the governor can move the sliding member, means carried by this connection for actuating the sliding member locking means and means for moving the gear coupling means by hand when the gear is in a neutral position as set forth.

8. In a gear changing mechanism the combination of a driving shaft, a driven shaft, means comprising gear wheels constantly in mesh for transmitting power in variable ratio from the driving to the driven shaft, means for coupling the gear wheels to their respective shafts and the shafts to each other in accordance with the desired power ratio, a sliding member connected to the coupling means, a rack fixed adjacent to the sliding member with teeth facing this member, a second rack fixed adjacent to the sliding member with teeth also facing the member but oppositely disposed with relation to the teeth of the first rack, pawls carried by the sliding member and each disposed and adapted to engage one of the racks, a chamber in the sliding member, a member mounted so as to reciprocate in this chamber, a spring disposed between each end of the chamber and the opposed face of the reciprocating member these springs forming operative connections between the sliding member and the reciprocating member, a governor, means for imparting rotation thereto from the driven shaft, a connection between the reciprocating member and the governor such that the member can be reciprocated by the governor and to an extent corresponding to the governor movements, and rollers so carried by the reciprocating member that when relative movement takes place between the reciprocating member and the sliding member the rollers will tend to disengage one or other of the pawls from its rack as set forth.

9. In a gear changing mechanism the combination of a driving shaft, an internal combustion engine by which power is transmitted through the driving shaft, electric ignition means for the internal combustion engine, a driven shaft, means comprising gear wheels constantly in mesh for transmitting power in variable ratio from the driving to the driven shaft, means for coupling the gear wheels to their respective shafts and the shafts to each other in accordance with the desired power ratio, a sliding member connected to the coupling means, pawls carried by the sliding member, fixed racks adapted to be engaged by these pawls, a governor, means for imparting rotation thereto from the driven shaft, a yielding connection between the governor and the sliding member through which the governor can move the sliding member, means carried by this connection for lifting the pawls out of engagement with the rack, a contact member disposed adjacent to the pawls and connected to the engine ignition means, and means for making contact with this contact member and short-circuiting the ignition device when a pawl is lifted beyond a predetermined extent as set forth.

10. In a gear changing mechanism the combination of a driving shaft, a driven shaft in alinement with the driving shaft, means comprising gear wheels constantly in mesh for transmitting power in variable ratio from the driving to the driven shaft, expanding clutches for coupling the gear wheels to their respective shafts and the shafts to each other in accordance with the desired power ratio, a clutch operating member axially movable within the alined ends of the driving and driven shafts, a sliding member connected to the clutch operating member, means for locking the sliding member in positions corresponding to the several gear ratios, a centrifugal governor, means for imparting rotation thereto from the driven shaft, a yielding connection between the governor and the sliding member through which the governor can move the sliding member, and means carried by this connection for actuating the sliding member locking means as set forth.

11. In a gear changing mechanism the combination of a driving shaft, a driven shaft, means comprising gear wheels constantly in mesh for transmitting power in variable ratio from the driving to the driven shaft, means for coupling the gear wheels to their respective shafts and the shafts to each other in accordance with the desired power ratio, a sliding member connected to the coupling means, means for locking the sliding member in positions corresponding to the several gear ratios, a centrifugal governor, means for imparting rotation thereto from the driven shaft, means for varying the centrifugal action and consequent movement derivable from the governor, a yielding connection between the governor and the sliding member through which the governor can move the sliding member to an extent determined by the centrifugal action of the governor, and means carried by this connection for actuating the sliding member locking means as set forth.

In testimony whereof I have signed my name to this specification in the presence of two subscribing witnesses.

FRED ALBERT ODDIE.

Witnesses:
   CAMPBELL BAILEY,
   H. S. VARLEY.